S. C. BOND.
DISK CUTTING MACHINE.
APPLICATION FILED FEB. 17, 1912.
1,059,268.
Patented Apr. 15, 1913.
2 SHEETS—SHEET 1.
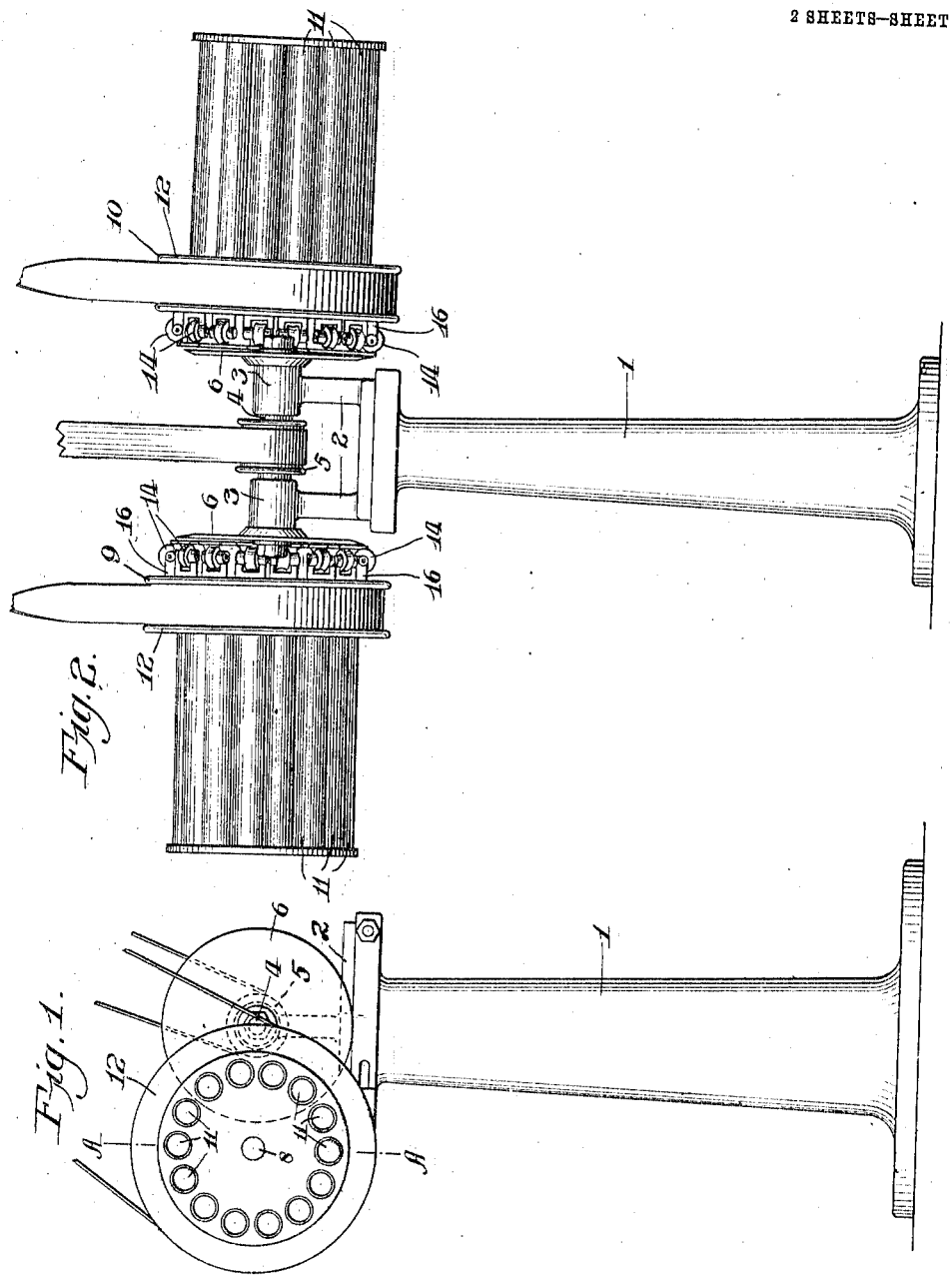
INVENTOR
Samuel C. Bond
WITNESSES
BY
ATTORNEY S. C. BOND.
DISK CUTTING MACHINE.
APPLICATION FILED FEB. 17, 1912.
1,059,268.
Patented Apr. 15, 1913.
2 SHEETS—SHEET 2.
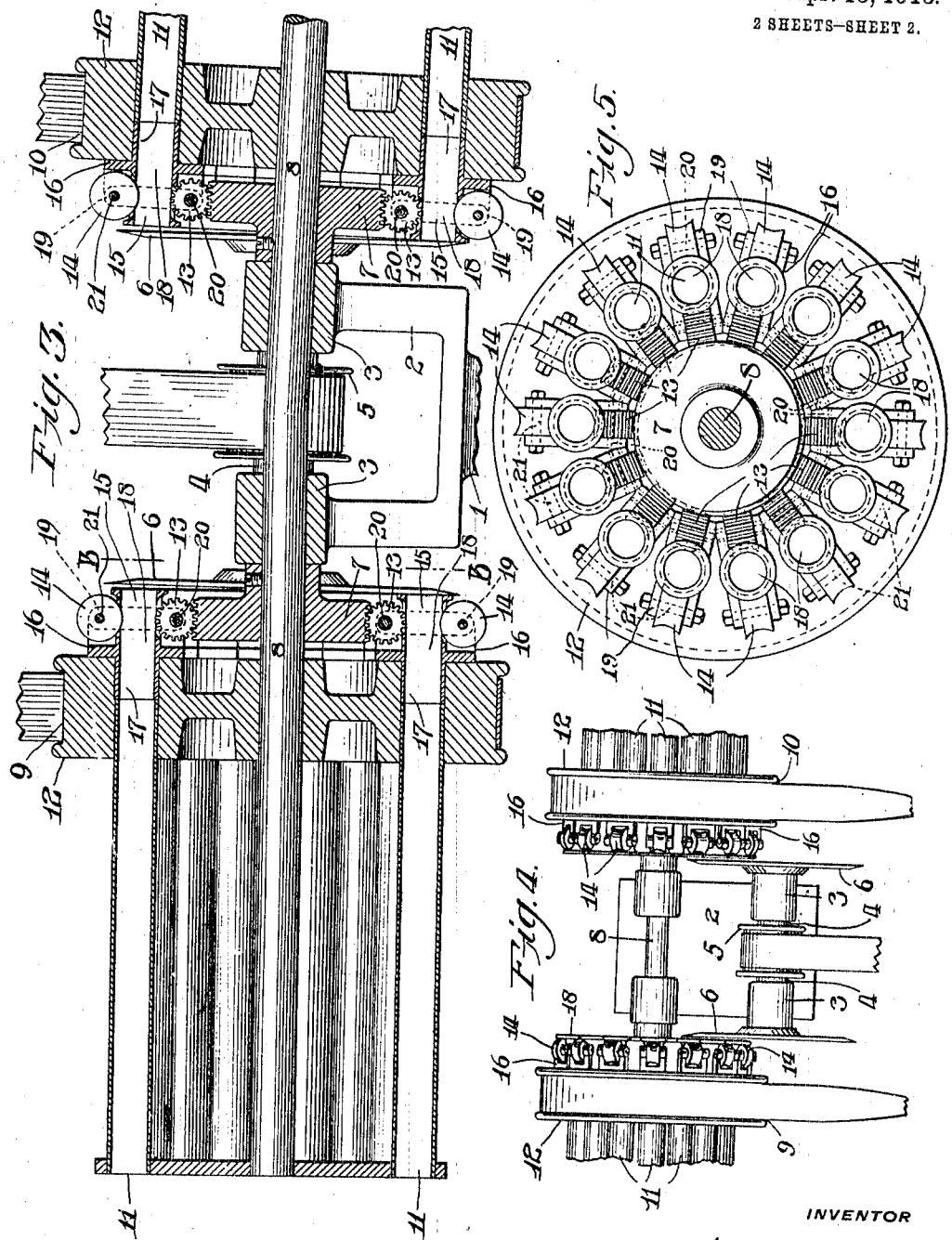
WITNESSES
INVENTOR
Samuel C. Bond
BY
ATTORNEY

UNITED STATES PATENT OFFICE.

SAMUEL C. BOND, OF HOLLYOAK, DELAWARE, ASSIGNOR TO BOND BOTTLE SEALING COMPANY, OF WILMINGTON, DELAWARE, A CORPORATION OF DELAWARE.

DISK-CUTTING MACHINE.

1,059,268. Specification of Letters Patent. Patented Apr. 15, 1913.

Application filed February 17, 1912. Serial No. 678,313.

*To all whom it may concern:*

Be it known that I, SAMUEL C. BOND, a citizen of the United States, and a resident of Hollyoak, Newcastle county, State of Delaware, have invented certain new and useful Improvements in Disk-Cutting Machines, of which the following is a specification.

My invention relates to improvements in machines for cutting disks from a cylindrical rod, and more particularly to improvements in machines for cutting a cylinder or rod of cork, or analogous material, transversely into disks of a predetermined thickness.

My invention in its preferred form comprises a suitable pedestal the top of which carries bearings for a shaft which carries at its center a driving pulley and at its ends circular knives; of two oppositely arranged sets of rotating carriers for the rods which are to be cut into disks; and of suitable means for rotating these carriers to bring the rods successively to the knives and for advancing a rod between successive contacts with the knife a predetermined distance to form a disk of the desired thickness.

In the accompanying drawings forming part of this specification and in which similar letters of reference indicate similar parts throughout the several views:—Figure 1, is a side and Fig. 2, a front elevation of my disk cutting machine. Fig. 3, an enlarged section through the carriers for carrying the rods to be cut to the circular knives, this section being upon the line A—A, Fig. 1; Fig. 4, a plan of that part of the machine included between the inner ends of the rod carriers; Fig. 5, a section of Fig. 3 on line B—B.

1 is a pedestal the top of which carries a frame 2 which carries bearings 3 for a shaft 4.

5 is a pulley upon shaft 4 which may be driven by a belt in the usual manner.

6 are circular knives carried by the opposite ends of shaft 4.

At the top of the pedestal 1 are two circular stationary plates 7 the respective peripheries of which are threaded in opposite directions and each of which is carried by a central stationary spindle 8 which carries rotating heads 9—10 which carry fixedly tubes 11 which surround the spindle 8 as shown.

12 are pulleys by means of which the heads 9—10 and the tube 11 carried thereby may be rotated upon and around the spindles 8.

Gearing with the threaded peripheries of the circular stationary plates 7 are small worm wheels 13—one for each tube 11 and opposite to each worm wheel is a grooved friction pulley 14.

The rods to be cut transversely into disks are passed one into each tube 11 and are each one gripped between a worm wheel 13 and a pulley 14. As the heads 9—10 carrying the tubes 11 are rotated around the spindle 8 the worm wheels 13 will, for each complete revolution of the heads, be rotated by the teeth upon the periphery of the plates 7 a distance equal to the pitch of the threads on the plates and the rod will be advanced during each complete revolution of the heads this distance. As each of the rods is brought into operative contact with the circular knives once during each revolution of the heads 9—10 the pitch of the threads upon the periphery of the stationary plates 7 determines the thickness of the disk to be cut. For instance, if it be desired to produce disks of 3/32 inch thickness the threads upon the plates 7 would be 3/32 inch pitch.

The circular knives 6 and the heads 9—10 carrying the tubes 11 which carry the rods 15 rotate in opposite directions and as both of the circular knives 6 are carried upon the same shaft and rotate in the same direction it follows that both of the sets of heads 9—10 rotate in the same direction, but as the rods carried by the tubes carried by the heads 9—10 on opposite sides of the machine have to be fed to the center of the machine the worm wheels 13, which in conjunction with the idlers 14, carried by opposite heads have to be driven one right and the other left, hence the peripheries of the stationary plates 7 are threaded one right and one left.

The feeding of the rods through the tubes 11 is slow but continuous, and in order that the rods after being cut by the knife shall not contact with the knife, to the injury of both of them, until a complete revolution of the heads 9—10 has been accomplished, the spindle 8 around which these heads turn is slightly out of the horizontal, its outer end being somewhat lower than its inner end. By this construction the inner ends of the tubes 11, and the heads 7 which carry these tubes, are slightly out of parallel with the knives 6, the upper parts of the heads being at a greater distance from the knives than the lower parts. The inclination is slight but sufficient to insure that the end of the rod after having been operated upon by the knife will not be moved into engagement with the side of the knife while these parts are in position to permit such an accident. In a fast moving machine of this description some arrangement of this kind is necessary to prevent the side of the knife from tearing the end of the rod or causing burning of the latter by the heat that would be developed by a frictional contact between the end of the rod and the side of the knife.

While I have shown and described a machine furnished with two oppositely placed heads it will, of course, be understood that either one of the heads may be dispensed with if desired.

The worm wheels 13 and the idlers 14 are, as has been before stated, arranged in pairs, that is each tube 11 is furnished at its inner end, or in line with its inner end, with a worm wheel and idler to feed the rod to the knives. A convenient means for carrying the worm wheel and idler consists of a frame 16, Figs. 3 and 5, which is furnished with a stem 17 which is adapted to be driven into a corresponding hole found in the webs of the pulleys 12, the inner ends of the tubes 11 being let into opposite sides of these webs and registering with the perforations 18 in these frames. The outer parts of the frames 16 carry ears 19 for carrying the pivots 20—21 which carry respectively, the worm wheels 13 and idlers 14 as shown.

While I have described my invention as a machine for cutting disks from rods it will be understood that it can as well be used to cut a tube transversely into washers of predetermined thickness.

Having thus described my invention I claim as new and desire to secure by Letters Patent:—

1. In a machine for cutting disks from cylindrical rods, in combination, a circular rotating knife, a means for carrying a plurality of rods and for bringing them successively into contact with and past the cutting edge of said knife, and a means for continuously advancing said rods through said carrying means.

2. In a machine for cutting disks from cylindrical rods, in combination, a circular rotating knife, a rotating means for carrying a plurality of rods and for bringing them successively into contact with and past the cutting edge of said knife, and means for continuously advancing said rods through said carrying means during the rotation of said carrying means.

3. In a machine for cutting disks from cylindrical rods, in combination, a circular rotating knife, a rotating cylindrically formed means adapted to carry a plurality of rods to and past the cutting edge of said knife, and means actuated by the rotation of said rod carrying means for continuously advancing said rods therethrough.

4. In a machine for cutting disks from cylindrical rods, in combination, a circular rotating knife, a rotating means for carrying said cylindrical rods, and means for continuously advancing said rods through said carrying means, the axes of said rod carrying means and of the spindle carrying said knife being slightly inclined the one toward the other as and for the purposes set forth.

5. In a disk cutting machine, in combination, a vertical rotating knife and means for driving the same, a stationary spindle, a pulley carried by and adapted to be rotated around said spindle, a multiplicity of tubes carried by said pulley circumferentially of said spindle adapted to carry rods to be severed by said knife, worm gears carried by said pulley, one for each tube, for advancing said rods through said tubes, and a stationary head the periphery of which carries a thread which meshes with and drives said worm wheel upon the rotation of said tube carrying pulley.

6. In a machine of the character set forth, in combination, a rotating head, a tube, open at both ends, carried by said head, and adapted to carry a rod, a frame having a perforated stem in alinement with said tube carried by said head and having ears to carry pivots, said pivots, a toothed wheel carried by the pivot upon one side of the frame adapted to engage and advance a rod in said tube, an idler carried by the pivot upon the opposite side of said frame adapted to engage the side of the rod opposite to that engaged by said toothed wheel, and means for rotating said toothed wheel upon a rotation of said head.

7. In a disk cutting machine, in combination, a knife and means for driving the same, a stationary shaft or spindle to one side of said knife and slightly inclined to the plane in which said knife runs, a pulley adapted to be rotated around said shaft or spindle, a multiplicity of tubes, open at both ends, the inner ends of which are carried in the web of said pulley and which are placed circumferentially around said shaft or spindle, and means operated by the revolution of said tube carrying pulley for advancing the rods carried by said tubes a predetermined distance in the direction of said knife during each revolution of said pulley.

8. The combination in a feeding device, of a circular stationary head the periphery of which is threaded, a rotating head, hollow guides carried by said rotating head for carrying the articles to be fed, worm wheels, one for each article to be fed, carried by said rotating head and meshing with the threads on said stationary head and engaging the articles to be fed, and idlers, carried by said rotating head and engaging the article to be fed upon a side opposite to that engaged by said worm wheels.

SAMUEL C. BOND.

Witnesses:
  ARTHUR H. G. GARRETT,
  RANDOLPH C. WILKINS.